United States Patent [19]

Cooley et al.

[11] Patent Number: 5,027,195
[45] Date of Patent: Jun. 25, 1991

[54] COLOR DETECTION AND/OR RECOGNITION APPARATUS

[75] Inventors: Roderick A. Cooley, Harpenden; ANthony J. Cronshaw, Stapleford, both of England

[73] Assignee: Xerox Corporation, Stamford, Conn.

[21] Appl. No.: 419,562

[22] Filed: Oct. 10, 1989

[30] Foreign Application Priority Data

Oct. 18, 1988 [GB] United Kingdom ............... 8824340

[51] Int. Cl.$^5$ .......................... H04N 9/07; H04N 1/46
[52] U.S. Cl. .......................................... 358/75; 358/44
[58] Field of Search ................. 358/75, 80, 41, 44, 358/494

[56] References Cited

U.S. PATENT DOCUMENTS

| | | | |
|---|---|---|---|
| 4,180,309 | 12/1979 | Miyata et al. | 354/409 |
| 4,213,145 | 7/1980 | Nagumo | 358/44 |
| 4,329,709 | 5/1982 | Masuda et al. | 358/44 |
| 4,558,357 | 12/1985 | Nakagawa et al. | 358/75 |
| 4,663,656 | 5/1987 | Elabd et al. | 358/75 |
| 4,672,433 | 6/1987 | Yamamoto et al. | 358/80 |
| 4,675,727 | 6/1987 | Sekizawa et al. | 358/75 |
| 4,761,683 | 8/1988 | Matteson et al. | 358/75 |
| 4,930,008 | 5/1990 | Suzuki et al. | 358/75 |

FOREIGN PATENT DOCUMENTS 3039451 6/1980 Fed. Rep. of Germany .

OTHER PUBLICATIONS

TCD140C, Toshiba Corp.

Primary Examiner—James J. Groody
Assistant Examiner—Kim Yen Vu
Attorney, Agent, or Firm—Mark Costello

[57] ABSTRACT

A color detection and/or recognition apparatus comprises a twin row array (16) of detector elements, each element being arranged to produce an electrical signal on detection of a given color. The two rows (21, 22) each comprise a plurality of groups of detector elements, with the elements in each group of at least one of the arrays being sensitive to a respective different color, with corresponding elements in the two rows being sensitive to different colors, and with the four elements of adjacent corresponding pairs of elements in the two rows being sensitive to at least three different colors. THe electrical signals are processed to provide a determination of the detection of color or the recognition of a color. The two rows of detector elements, typically photosensitive sites in CCD arrays, may be formed closely adjacent one another on the same semiconductor substrate, together with CCD shift registers (23, 24) along the outside edges of the two rows. A line buffer delay circuit (25) may be provided for the outputs of one of the rows.

17 Claims, 2 Drawing Sheets

COLOR DETECTION AND/OR RECOGNITION APPARATUS

This invention relates to a color detection and/or recognition apparatus which is particularly, although not exclusively, useful for determining color on a surface. The apparatus may be used, for example, in a xerographic copying machine where it is desired to determine the color or colors contained in areas of an original document to be copied, in order that the copy can be made to contain colors in corresponding areas of the copy.

BACKGROUND OF THE INVENTION

Xerographic copiers are now available in which the operator may choose between differently colored toners for developing the image. In some such copiers, it is possible to copy only in one color at a time, the color of the copy being determined by the color of the toner in a developer unit. Other such machines may contain two or more differently colored toners, selectable by the operator. Full color copiers, such as the Xerox (Trade Mark) 1005, are also known in which three or more separate images are automatically developed in succession with different colored toners to form a full color copy. Such full color copiers are, however, complex and expensive, and of limited utility in the ordinary office environment. It is, however, relatively simple to arrange for only selected portions of a copy to be developed in a color different from the rest of the copy. Thus, for example, it may be desired to copy a letter which has its text in black on a white background, but with a blue or red heading or logo. A simple xerographic copier can be relatively easily adapted to cater for this, by arranging for each copy to pass through the copying cycle twice, once using black toner, and developing all but the colored areas, and once using a colored toner, developing only the colored areas of the image. The relevant portions of the image to be copied in color may be selected manually by the operator, thereby setting the machine to cause selective erasure of the part of the image not to be developed on each cycle. One such machine which uses this 'color highlighting' approach is the Canon NP-3525.

It would be desirable to provide a way of detecting or recognizing color automatically, so that the making of 'highlight color' copies as described above could be carried out automatically.

Color image reading apparatuses are known, for example, from U.S. Pat. No. 4,558,357, which describes a device having three lines of CCD arrays, in which each array is sensitive to a different color. As the image is scanned past the arrays, the outputs of the arrays are accumulated in line memories so that the color information from the three lines can be output in synchronism. U.S. Pat. No. 4,663,656 describes a CCD imager for a camera which uses four lines of CCD arrays, and a beam splitter to cause multiple line images of a single object line to fall on the arrays. Each array is made sensitive to a different color by means of a filter stripe. U.S. Pat. No. 4,675,727 describes a color document reading apparatus which uses a sensor array, such as a CCD array, with successive groups of three sensing elements along the array being sensitive to three different colors. Alternatively, three lines of arrays may be used, each array being sensitive to a different color. DE-A1-3,039,451 describes a device for electronically scanning pictures for reproduction on a television set. The device uses a two-line color-filtered CCD array with an external delay line of duration equal to the scanning interval between two rows. The two arrays do not, however, view corresponding areas of an image because the photosensitive elements for different colors are of different lengths. If such an arrangement were used for color detection or color recognition (such use not being described in the referenced document), it would give rise to false color detection because of the different areas viewed by the two lines. Of background interest are U.S. Pat. No. 4,761,683 to Matteson et al., which shows an arrangement for a color sensor array for imaging with three rows of sensors, each having a distinct color, U.S. Pat. No. 4,329,709 to Masuda et al., which describes a solid state imaging device with an arrangement of filtered photosites in a matrix providing the color signal information necessary within one horizontal period for the reduction of vertical smear. Additionally, U.S. Pat. No. 4,672,433 to Yamamoto et al. discusses the problems associated with detection of color by spacially displaced and differently filtered detectors. The patents cited herein are incorporated by reference. Additionally, the Toshiba TCD 140C-2 by Toshiba Corporation shows color detection by a series of arrays, each differently filtered, with the data subsequently stitched together.

Problems arise in colored text detection because of the (small) physical size of the lines which make up the letters of the text. In known color detection systems, as outlined above, color content comparisons have been made using three or more physically separated and filtered rows of sensors, or by using a single row of alternating red, green and blue filtered sensors. For alternating sensors, there must be several red, green and blue groups within the image of the line in order to prevent false color information. False color information can be obtained when each sensor is not looking at exactly the same area on a document. Thus a black line which falls on a red detector may not fall on a green or blue sensor. This gives an imbalance or false color information when the outputs of the sensors are compared.

This problem of false color leads to a requirement, using the known systems, either for very high resolution sensor arrays, or for accurately aligned multi-sensor array systems.

SUMMARY OF THE INVENTION

The present invention is intended to overcome this problem, and to provide a color detection and/or recognition apparatus which is relatively simple and inexpensive, yet which provides good resolution and substantial immunity from false color detection.

According to the present invention, there is provided a color detection and/or recognition apparatus comprising a twin row array of detector elements, each element being arranged to produce an electrical signal on detection of a given color; the two rows each comprising a plurality of groups of detector elements, with the elements in each group of at least one of the rows being sensitive to a respective different color, with corresponding elements in the two rows being sensitive to different colors, and with the four elements of adjacent corresponding pairs of elements in the two rows being sensitive to at least three different colors; and means for processing the electrical signals to provide a determination of the detection of color or the recognition of a color.

According to another aspect of the invention, there is provided an apparatus for detecting and/or recognizing color on a surface, comprising the apparatus of the preceding paragraph; means to form an image of the surface on the array; and means to cause relative movement between the image of the surface and the array in a direction perpendicular to the length of the array; the means for processing the signals being arranged to compare the signals derived from corresponding groups of elements from the two rows, whereby for a region on the surface corresponding with the groups of elements, color may be detected or recognized.

In another aspect, the invention provides a color detection device comprising two rows of detector elements, each individual element being sensitive to light of a particular color to produce an electrical signal on detecting the color, the elements being of a plurality of different color sensitivities and being arranged in a predetermined pattern, and the light-sensitive portions of the elements in the two rows being formed on a single semiconductor substrate.

In its color detection mode, the apparatus of the invention may be used to detect color as opposed to black, white or grey. In its color recognition mode, the apparatus of the invention may be used to recognize, i.e. identify, the color. It is to be understood that the use of the word 'color' means not only a color distinguishable by the human eye, but also wavelengths outside the visible spectrum, such as infra red and ultra violet.

An apparatus in accordance with the invention will now be described, by way of example, with reference to the accompanying drawings, in which.

Figure 1:
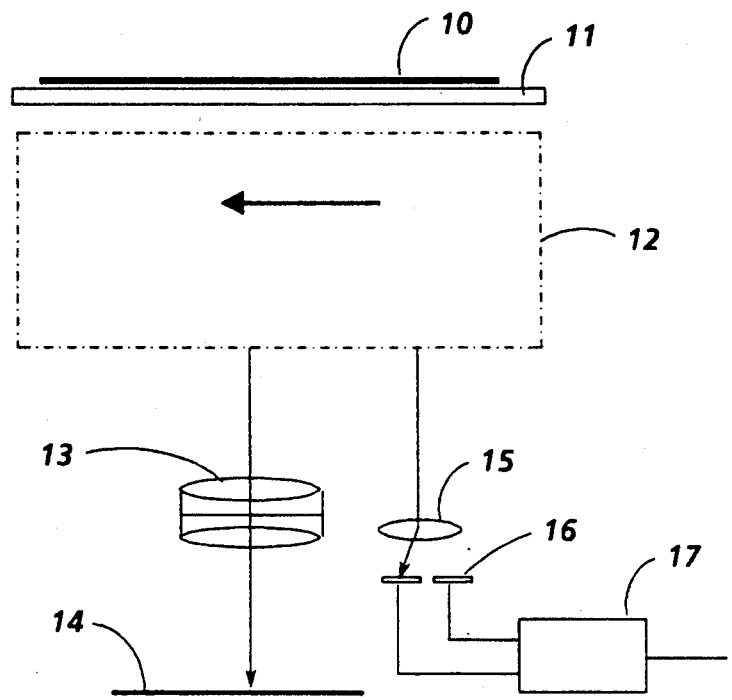
FIG. 1 is a simplified diagram for explaining the operation of the apparatus of the invention used in a xerographic copier.

Referring to FIG. 1, where the showings are for the purpose of illustrating the invention and not for limiting same, a document 10 is placed, face down, on a transparent platen 11 where it is scanned by a scanning system represented by the broken outline 12. The scanning system 12 may be, for example, a full- and half-rate scanning mirror system of the kind well known in xerography, and may also include an illuminator (not shown). Alternatively, a static optical system may be used in conjunction with a moving platen, as is also well known. In either case, a strip-like image of a line of picture elements of the object document is formed with the aid of lens 13 at an image plane 14. In the image plane an electrically charged photoreceptor (not shown) is moved in synchronism with the scanning of the document, thereby laying down an electrostatic latent image of the document on the photoreceptor. This electrostatic latent image is then developed, transferred to a copy sheet and fixed thereon, as is well known in the art of xerography.

Located to one side of the lens 13, so as to receive light from the same scan line as the lens 13, is a second lens 15 which focuses an image of the scan line onto an array 16 of light-sensitive detector elements of a color detection/recognition apparatus according to the invention. Electrical output signals from the array 16 are processed by circuitry indicated at 17, as will be discussed below, to provide a determination of the detection or the recognition of a color.

When colored areas have been detected or recognized, their coordinates are stored and used to differentially discharge corresponding areas of the photoreceptor, such that during a first cycle only the black and white areas are developed, and during a second cycle only the colored areas are developed.

Figure 2:
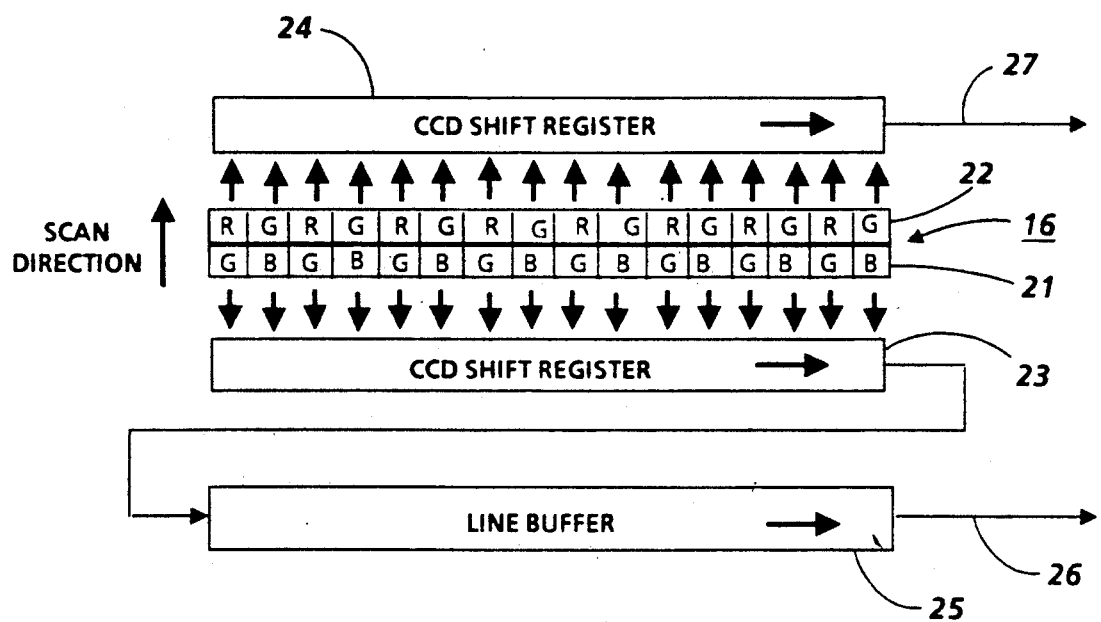
FIG. 2 is a diagram of the detector elements and immediately associated circuitry of the apparatus of the invention.

Referring to FIG. 2, there is shown a diagram of one possible arrangement of the array 16 of detector elements. The array 16 comprises a double row 21, 22 of photosensitive sites, each row forming part of a substantially conventional CCD line scan array. The two rows are preferably formed on a single piece of silicon, together with at least their immediately associated circuitry. The immediately associated circuitry comprises CCD shift registers 23, 24 for the rows 21, 22 respectively, and a line buffer 25 associated with the first row 21.

A mosaic of color filters overlays the detector elements, as indicated in FIG. 2 by R, B and G, representing red, green and blue filters respectively. In the arrangement shown, the first row 21 has alternating green and blue filters, while the second row 22 has, in corresponding positions, alternating red and green filters. Thus any group of four detecting elements comprising corresponding neighboring pairs of elements from the two rows contains filters of three different colors. In an alternative arrangement, not shown, it is possible to have three different colors in such a block of four elements by having two colors alternating with each other in one row, and having all the elements of the other row of a third color. Another alternative arrangement is to have each row with alternating red, green and blue filters, the filters of the two rows being in the same sequence, but having the colors of corresponding elements in the two rows displaced from one another. Once again, this ensures that three different colors are present in any block of four elements comprising corresponding pairs of elements from the two rows. As an alternative to filters, the individual detector elements may be inherently sensitive to different colors.

The line buffer 25 is used to delay the information signals from the first row 21 by precisely the time interval that it takes for the scanning system to scan from the first row 21 to the second row 22. In this way, the outputs of the two rows are synchronized, with the output signal for a given element in the first row appearing on output line 26 at the same time as the output signal for the corresponding element in the second row 22 appears on output line 27. This has the same effect as if the two arrays were optically superimposed, i.e. both arrays are 'looking at', or having projected onto them an image of, the same scan line on the original document 10. As an alternative to using the electronic delay introduced by the line buffer 25, it is possible to use an optical arrangement, such as a beam splitter, an astigmatic lens, or a diffraction grating (using, for example, the zeroth and first order diffractions), to cause both arrays to effectively look at the same line of the document.

By forming both rows on the same silicon chip, it is possible to have the light sensitive detecting elements of the two rows abutting or substantially abutting one another, so that scan imperfections in the optical scanning arrangement can be ignored. When both rows are formed on a single chip, the immediately associated circuitry for the two rows can be located along the outside edges of the two rows. Thus, for example, the line buffer may be provided on the chip in the form of a parallel-in, parallel-out register alongside the first row of detector elements. This stores the signals output from the elements of the first row, delaying them before they are transferred to the associated CCD shift register alongside (and on the outside edge of) the line buffer. The signals output by the elements of the second row are transferred directly into the CCD shift register. The line buffer may use CCD elements similar to those in the shift registers.

In the arrangement of FIG. 2, the two rows of detector elements may be thought of as alternating pairs of red and green sensors and of green and blue sensors. If appropriate circuitry is used to obtain equal signals for the red, green and blue sensors when looking at white light, a red or green color may be detected whenever an imbalance occurs between any of the red/green sensor pairs. Black, white or grey will show no imbalance between the sensors of red/green pairs. Also, blue will show no imbalance because a red/green pair will see blue as grey or black. Similarly, a green or blue color can be detected by looking for a color imbalance between the green/blue pairs. For these pairs, red will appear as either grey or black. However, the adjacent red/green pair is capable of detecting red. Thus, any block of four elements, comprising corresponding neighboring pairs of elements from the two rows, is capable of identifying the color.

Table 1 below shows the way different colors can be identified using the arrangement described with reference to FIG. 2. In the Table, '1' represents a signal, and '0' represents no signal. An external memory may be used in conjunction with a pixel correction chip to ensure that each sensor will give the same signal when looking at a white reference surface. In practice, a threshold is required to eliminate noise when looking for a color imbalance between pixels.

TABLE 1

| COLOR | OUTPUT FROM RED AND GREEN SENSOR PAIRS | | OUTPUT FROM BLUE AND GREEN SENSOR PAIRS | | COLOR IMBALANCE IN ANY PAIR? |
|---|---|---|---|---|---|
| | RED SIGNAL | GREEN SIGNAL | BLUE SIGNAL | GREEN SIGNAL | |
| BLACK | 0 | 0 | 0 | 0 | NO |
| BLUE | 0 | 0 | 1 | 0 | YES |
| GREEN | 0 | 1 | 0 | 1 | YES |
| RED | 1 | 0 | 0 | 0 | YES |
| CYAN | 0 | 1 | 1 | 1 | YES |
| MAGENTA | 1 | 0 | 1 | 0 | YES |
| YELLOW | 1 | 1 | 0 | 1 | YES |
| WHITE | 1 | 1 | 1 | 1 | NO |

Figure 3:
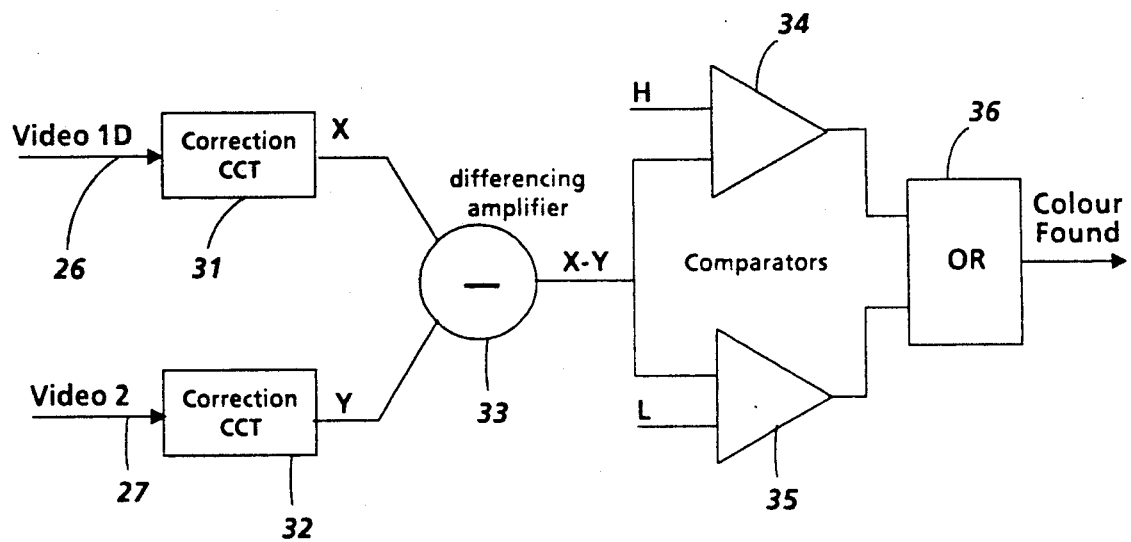
FIG. 3 is a simplified circuit diagram for color detection.

Referring now to FIG. 3, there is shown a color detection circuit, which operates as follows. Signals 'Video 1-D' and 'Video 2' are normalized by correction circuits 31, 32 giving signals x and y respectively such that x and y are equal to a fixed voltage when the array is exposed to white light. Signals x and y are now fed to a differencing amplifier 33 whose output, (x−y) is then compared with an upper and a lower threshold (H and L) by comparators 34 and 35. If the difference signal (x−y) is higher than the upper threshold H, or lower than the lower threshold L, then an output 'color found' is set true by OR gate 36. Otherwise the output is false.

It should be noted that areas of white, black or intermediate shades of grey will all produce a false output. This is because the signals x and y will be equally attenuated and the balance of x and y will be maintained. Conversely, 'color found' will be true whenever a colored image (red, green, blue, etc.) causes an imbalance in the signals x and y.

Figure 4:
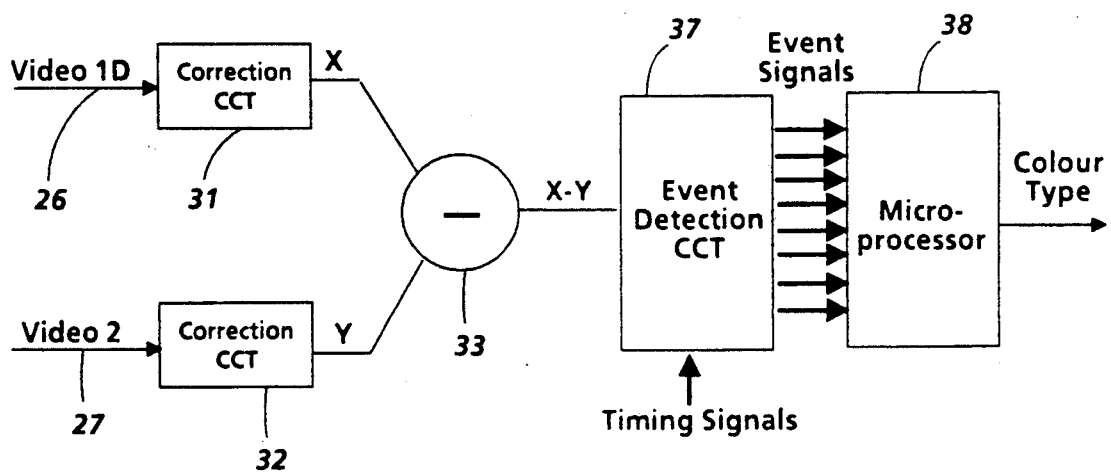
FIG. 4 is a simplified circuit diagram for color recognition.

The circuit described in FIG. 3 can be extended, as will be described with reference to FIG. 4, to carry out color recognition, i.e. identification. The circuit of FIG. 4 includes correction circuits 31 and 32, and a differencing amplifier 33, the same as the FIG. 3 circuit. The output of the differencing amplifier, however, is connected to an 'event detection' logic circuit 37, which produces a classified version of the events already described above for color detection. An example of an event is that the (R−G) difference (represented by the (x−y) signal) produces a positive voltage. Another example is that the (G−B) difference produces a balanced voltage (i.e. zero volts). A third example is when one of the differences produces a negative voltage.

Table 2 below sets out the various events which can occur in a three color system, and the colors represented by the events. The events are coded '+', '0', and '−' in the table, corresponding with the examples just described. The event signals are connected to a microprocessor 38 which then determines the color type. For the two row arrangement of FIG. 2, only two of the three columns shown in Table 2 will be available. As can be seen, however, only two columns are needed to identify any of the colors shown.

TABLE 2

| Events | | | COLOR TYPE |
|---|---|---|---|
| R-G | G-B | B-R | |
| + | 0 | − | red |
| − | + | 0 | green |
| 0 | − | + | blue |
| − | 0 | + | cyan |
| 0 | + | − | yellow |
| + | − | 0 | magenta |
| 0 | 0 | 0 | white, black or grey |

What is claimed is:

1. Color detection and/or recognition apparatus for detecting or recognizing colors on an original surface comprising:
   a twin row array of detector elements, each detector element in each row of the array being arranged to produce an electrical signal on detection of a given color;
   the two rows each including a plurality of groups of detector elements, with the elements in each group of at least one of the rows being sensitive to a respective different color, with corresponding elements in the two rows being sensitive to different colors, whereby among adjacent elements in one of the rows and corresponding elements in the other of the rows, there are elements sensitive to at least three different colors; and means for processing said electrical signals to provide a determination of the detection of color or the recognition of a color.

2. The apparatus of claim 1 wherein the detector elements are photosensitive sites in CCD arrays.

3. The apparatus of claim 1 wherein each detector element has an associated filter to provide detection by each element of a given color.

4. The apparatus of claim 1 wherein one of the rows of the array has groups of two elements, each sensitive to a different color, and the other row has groups of two elements each, sensitive to one of the colors to which the elements of said one row are sensitive, and a third color.

5. The apparatus of claim 1 wherein one of the rows has groups of two elements, each sensitive to a different color, and the other row has all its elements sensitive to a third color.

6. The apparatus of claim 1 wherein one of the rows has groups of three elements sensitive to a pattern of different colors, and the other row also has groups of three elements sensitive to said pattern of three colors, the groups in one row being displaced relative to those in the other row.

7. The apparatus of claim 1 including:
circuit means for delaying the electrical signals output from one of the rows so as to make them coincide in time with the signals derived from corresponding elements in the other row.

8. In an original handling device, including color detection and/or recognition apparatus for detecting or recognizing colors on a surface of an original comprising:
a twin row array of detector elements, each element being arranged to produce an electrical signal on detection of a given color;
the two rows each including a plurality of groups of detector elements, with the elements in each group of at least one of the rows being sensitive to a respective different color, with corresponding elements in the two rows being sensitive to different colors, whereby among adjacent elements in one of the rows and corresponding elements in the other of the rows, there are elements sensitive to at least three different colors;
means for processing said electrical signals to provide a determination of the detection of color or the recognition of a color;
means to form an image of the original surface on said array;
means to cause relative movement between the image of the original surface and the array in a direction perpendicular to the length of the array; and
said means for processing the signals being arranged to compare the signals derived from corresponding groups of elements from the two rows, whereby for a region on said surface corresponding with said groups of elements, color may be detected or recognized.

9. The apparatus of claim 8 wherein the detector elements are photosensitive sites in CCD arrays.

10. The apparatus of claim 8 wherein each detector element has an associated filter to provide detection by each element of a given color.

11. The apparatus of claim 8 wherein one of the rows of the array has groups of two elements each sensitive to a different color, and the other row has groups of two elements each sensitive to one of the colors to which the elements of said one row are sensitive, and a third color.

12. The apparatus of claim 8 wherein one of the rows has groups of two elements sensitive to different colors, and the other row has all its elements sensitive to a third color.

13. The apparatus of claim 8 wherein one of the rows has groups of three elements sensitive to a pattern of different colors, and the other row also has groups of three elements sensitive to said pattern of three colors, the groups in one row being displaced relative to those in the other row.

14. The apparatus of claim 8 including:
circuit means for delaying the electrical signals output from one of the rows so as to make them coincide in time with the signals derived from corresponding elements in the other row.

15. A color detection and/or recognition device comprising:
two rows of detector elements, each element, having generally the same size and sensitive to light of a particular color to produce an electrical signal on detecting the color;
said two rows of detector elements arranged substantially parallel with respect to each other, in abutment or substantial abutment on a single semiconductor substrate, each row arranged so each detector element in each row is in abutment or substantial abutment with a single detector element in the other row;
the elements in the two rows each having a selected different color sensitivity from a predetermined group of color sensitivities; and
the elements being arranged in a predetermined pattern of color sensitivities, with the light-sensitive portions of the elements in the two rows being formed on a single semiconductor substrate.

16. The device as defined in claim 15 wherein said two rows of detector elements are arranged with no intervening circuitry therebetween, and with CCD shift registers along the non-abutting edges of the two rows.

17. The device as defined in claim 15 including on said substrate a line buffer for delaying the output signals from one row compared with the signals output from corresponding elements of the other row.

* * * * *